Sept. 13, 1960
T. W. FINDLEY ET AL
2,952,527
VAPOR PHASE REACTION VESSEL
Filed Jan. 2, 1958
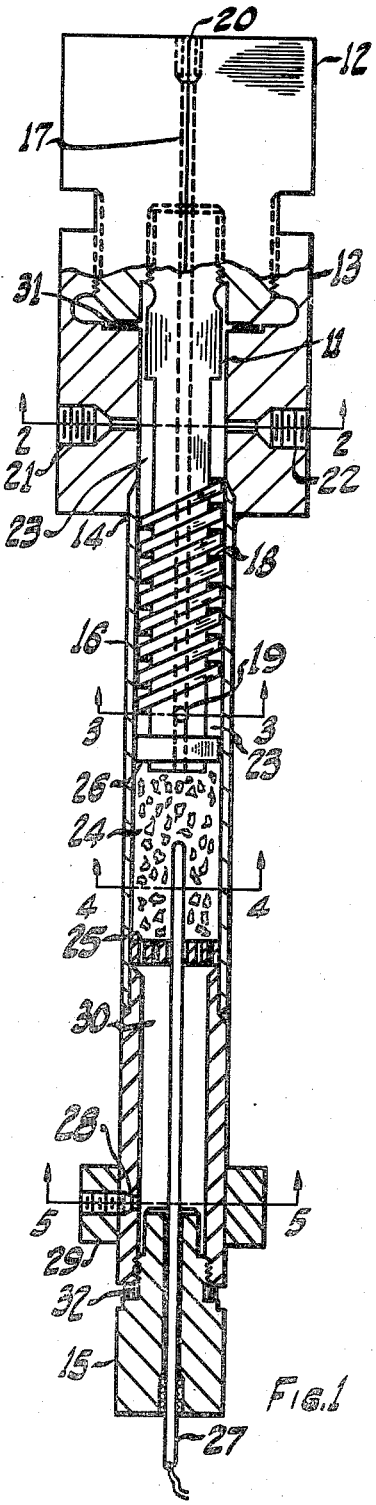
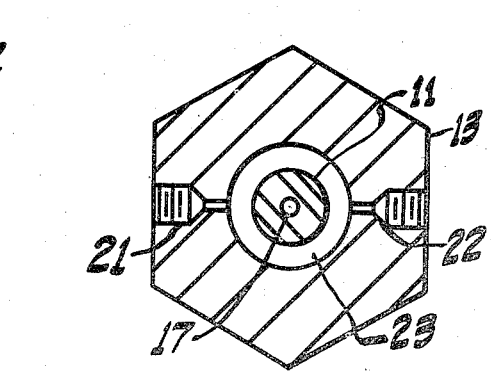
Fig.2
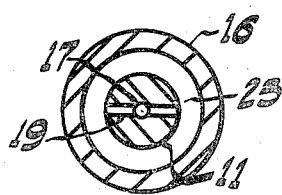
Fig.3
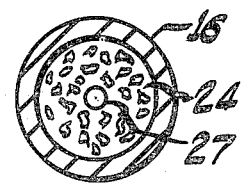
Fig.4
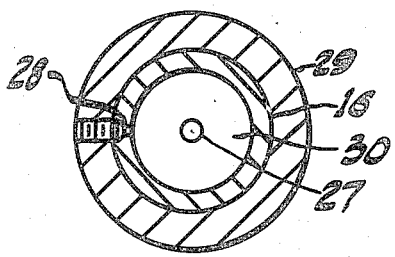
Fig.5
THOMAS W. FINDLEY
KARL J. MOULTON
INVENTOR.
BY R. G. Story United States Patent Office 2,952,527
Patented Sept. 13, 1960

2,952,527

VAPOR PHASE REACTION VESSEL

Thomas W. Findley and Karl J. Moulton, La Grange, Ill., assignors to Swift & Company, Chicago, Ill., a corporation of Illinois Filed Jan. 2, 1958, Ser. No. 706,773

2 Claims. (Cl. 23—288)

The present invention relates to reaction vessels, and in particular is concerned with a redesigned and improved vapor phase reaction vessel.

In many chemical processes it is important to keep the components of a reaction apart until a particular temperature has been reached and until all of the materials involved in the reaction have vaporized. Additionally, the successful completion of a process often requires the reactants to be thoroughly mixed as they enter a reaction zone.

Attempts to design apparatus which satisfy the above conditions have not met with complete success. It is, therefore, an object of the present invention to provide apparatus which is capable of heating separated materials to reaction temperatures.

Still another object of the invention is to provide apparatus which allows properly heated reactants to be thoroughly mixed as they enter a reaction zone.

Another object is to provide apparatus which can be used safely at high temperatures.

Yet another object of the invention is to provide apparatus which quickly vaporizes liquid components of a reaction and which moves the components to a reaction zone at a desired velocity.

Other objects of the invention will become readily apparent to those skilled in the art from the following detailed description of the invention.

In general, the present invention comprises certain improvements which have been made in vapor phase reaction vessels. More particularly, the present invention comprises a vessel having separate passages for heating and carrying each reaction component and means to allow these components to be mixed just prior to their entering a reaction zone.

The invention can be more readily understood by reference to the following description of the attached drawings.

Figure 1 is a vertical sectional view with some parts in elevation of an embodiment of the present invention. The preheater, reaction zone, and collection zone have been compressed in order to allow a more detailed presentation of other areas of the vessel.

Figure 2 is a cross-sectional view taken through line 2—2 of Figure 1.

Figure 3 is a cross-sectional view taken through lines 3—3 of Figure 1.

Figure 4 is a cross-sectional view taken through lines 4—4 of Figure 1.

Figure 5 is a cross-sectional view taken through lines 5—5 of Figure 1.

In Figure 1, preheater 11 of the reactor is screwed into or otherwise attached to top closure 12, which in turn is screwed into top coupling 13, making a vapor tight seal at gasket 31. The body 16 of the reactor is welded to the top coupling at fillet 14. The lower end of body 16 is attached to bottom closure 15 with a seal at gasket 32. Preheater 11 includes vapor passage 17, helix 18, and vapor hole 19. Collar 26 of preheater 11 prevents vapors from passing directly into reaction zone 24. Closure 12 contains inlet 20, which communicates with fluid passage 17. Inlets 21 and 22 have been placed in coupling 13 and communicate with fluid passage 23. Reaction zone or bed 24 is within body 16 and lies between grid 25 and preheater collar 26. Thermocouple 27 is shown extending from bed 24 through bottom closure 15. Outlet 28 of body 16 connects collecting area 30 to a passage within ring 29 and to receiving means which are not shown.

Figure 2 illustrates the relationship between fluid passage 17, preheater 11, and fluid passage 23. It also shows inlets 21 and 22 of top coupling 13 which communicate with fluid passage 23.

In Figure 3, vapor hole 19 passes through preheater 11 to join fluid passage 23 to fluid passage 17. As vapor from inlet 20 passes vapor hole 19 it mixes with fluid from passage 23 as it moves along passage 17 to reaction zone 24.

Figure 4 shows thermocouple 27 movably positioned within bed 24.

Figure 5 illustrates the relationship between outlet 28, thermocouple 27, collecting area 30, body 16, and ring 29.

In operation, the reactor is usually placed within a furnace or other heating device to provide a proper temperature for the reaction. Liquid or gaseous components are introduced through inlets 20, 21, and/or 22. Where only two reactants are to be used, either inlet 21 or inlet 22 can be closed off. If a liquid component is introduced into either inlet 21 or inlet 22, the material passes along helix 18 where it is quickly vaporized. The component of the reaction introduced through inlet 20 is also heated to a reaction temperature in preheater 11. When this material reaches vapor hole 19 it is combined with the vaporized component contained within passage 23 whereupon the mixed reactants are immediately delivered to reaction zone or bed 24. The new products that are formed in the reaction zone along with unreacted materials pass through grid 25 into collection area 30 and then through outlet 28 to receivers which are not shown.

Although helix 18 preferably is a part of the outer wall of preheater 11, it would also be possible to have the the inner wall of body 16 assume a helical configuration. When all of the reactants are vapors, the helix can, of course, be eliminated. Similarly, should a liquid be introduced at inlet 20 it would be possible to give passage 17 a helical shape to help vaporize the material.

The unique construction of the present apparatus makes it possible to carry out a number of reactions which otherwise would be difficult, if not impossible, to complete satisfactorily. Among these reactions are vapor phase oxidation and reduction reactions, high temperature cracking and hydrolytic processes, and, in general, any reaction which takes place in a gaseous state between two or more components.

The following example shows the use of the subject apparatus to oxidize a fatty material.

A reaction vessel of the present invention having inlets 20 and 21 open and inlet 22 closed was inserted in a block furnace made of an aluminum-bronze alloy. After establishing a constant temperature of 850° F. in the furnace, methyl palmitate was pumped into inlet 21 at a space velocity of 0.9 cc. per cc. of packing per hour. Simultaneously, oxygen was metered into inlet 20 at a rate of 1.26 mols per mol of the fatty ester. The vapors of the two reactants were combined at vapor hole 19 and were then immediately delivered to reaction zone 24, which was packed with inert glass beads. After the resultant materials had passed through grid 25 to collection area 30, the liquid components were sent to a receiver and the gaseous matter was passed through a wet test meter. An analysis of the liquid product by fractionation under 5 mm. pressure disclosed the following materials to be present on a weight basis:

24.1% oxidized fatty material having a lower boiling point and a greater volatility than the feed stock
67.5% unreacted methyl palmitate
3.9% polymer
4.5% water An analysis of the gas from the wet test meter disclosed that it contained no unreacted oxygen.

The term "space velocity" is defined as the volume of liquid feed passing through the reaction zone per hour per volume of empty and occupied area within the reaction zone. The reactor used in the above example had a reaction zone volume of 70 ccs. Where the space velocity selected for a given run is 0.4, for example, 70 times 0.4 cc. or 28.0 ccs. of feed stock per hour are then moving through the reactor.

The selection of a catalyst to be placed in the reaction zone is often extremely important. It has been found, for example, that certain catalysts tend to produce a higher yield of product and/or tend to cause the formation of specific compounds. Inert materials, such as glass beads, steel balls, etc., can be used where no catalyst is necessary to the success of the reaction.

Thermocouple 27 is movable inserted within the vessel in order to determine the temperature of reaction zone 24. By this means temperature conditions can be recorded and then adjusted according to the requirements of the particular process.

Under normal circumstances, the subject apparatus is placed within a metallic block furnace prior to the commencement of the reaction. Inasmuch as the reaction zone is therefore surrounded by a block of metal, it is possible to carry out reactions in the apparatus under extreme temperature and pressure conditions. When an aluminum-brass alloy furnace is employed, for example, temperatures up to 650° C. and pressures up to 10,000 p.s.i. can safely be applied to the system.

Although the subject apparatus has principally been designed to carry out vapor phase reactions involving two or more ingredients, it also possesses advantages where only one active material is involved. In cracking operations, for example, feed stock introduced into either inlet 21 or inlet 22 can be swept into reaction zone 24 by an inert gas flowing through passage 17 at a given space velocity. In this way the period of time that the feed stock remains within both the preheater and the reaction zone can be controlled independently within the same piece of equipment.

Obviously many modifications and variations of the invention as hereinbefore set forth may be made without departing from the spirit and scope thereof, and therefore only such limitations should be imposed as are indicated in the appended claims.

We claim:
1. An improved vessel for reacting ingredients in the vapor phase said vessel comprising: a cylindrical body member adapted to be inserted within a source of controlled heat; a reaction chamber within said body member, said chamber having an inlet and an outlet; a longitudinal delivery passageway extending from one end of said body member to said inlet of said reaction chamber, said longitudinal passageway being of uniform cross-sectional size throughout and adapted to direct a vaporous ingredient from said one end of said body member to said reaction chamber; a helical delivery passageway connected between said one end of said body member and said longitudinal passageway at a point between said one end and said inlet, said helical passageway being arranged about the periphery of said body member and having a length sufficient to enable an ingredient passing therethrough to said reaction chamber to absorb sufficient heat from the controlled heat source to vaporize the said ingredient prior to said ingredient reaching said longitudinal passageway.

2. An improved vessel for reacting ingredients in the vapor phase, said vessel comprising: a tubular body member adapted to be inserted within a source of controlled heat; a reaction chamber within said body member; a longitudinal delivery passageway for directing an ingredient from one end of said body member toward said reaction chamber; a helical delivery passageway for directing an ingredient from said one end of said body member toward said reaction chamber, said helical passageway being arranged about the periphery of said body member and having a length sufficient to enable the ingredient passing therethrough to absorb sufficient heat from the controlled heat source to vaporize the said ingredient; a connector joining said longitudinal and said helical delivery passageways; said connector having an opening of substantially the same cross-sectional size as said longitudinal passageway and positioned to join said longitudinal and helical delivery passageways with an end of said reaction chamber whereby said vaporized ingredients will be united and delivered to said reaction chamber without undergoing any substantial heat or pressure drop; and an exit connected to the opposite end of said reaction chamber.

References Cited in the file of this patent
UNITED STATES PATENTS 1,814,796   Grebe _____ July 14, 1931
2,271,017   Leprestre _____ Jan. 27, 1942